(12) United States Patent
Victor

(10) Patent No.: US 11,173,929 B2
(45) Date of Patent: Nov. 16, 2021

(54) INCREASED TRACTIVE EFFORT YARD AND ROAD SWITCH LOCOMOTIVES

(71) Applicant: Paul Victor, Broad Channel, NY (US)

(72) Inventor: Paul Victor, Broad Channel, NY (US)

(73) Assignee: Paul M. Victor, Broad Channel, NY (US)

( * ) Notice: Subject to any disclaimer, the term of this patent is extended or adjusted under 35 U.S.C. 154(b) by 365 days.

(21) Appl. No.: 16/371,438

(22) Filed: Apr. 1, 2019

(65) Prior Publication Data
US 2020/0307652 A1    Oct. 1, 2020

(51) Int. Cl.
*B61C 7/04*    (2006.01)
*B61C 13/00*    (2006.01)

(52) U.S. Cl.
CPC .............. *B61C 7/04* (2013.01); *B61C 13/00* (2013.01)

(58) Field of Classification Search
CPC ............ B61C 7/00; B61C 7/104; B61C 13/00
See application file for complete search history.

(56) References Cited

U.S. PATENT DOCUMENTS 2,829,605 A      4/1958  Kell et al.
4,231,296 A  *  11/1980  Jackson .................... B61F 3/04
                                                                 105/136
6,267,062 B1 *  7/2001  Hamilton, Jr. ............ B61C 7/04
                                                                 105/26.05
6,408,766 B1 *  6/2002  McLaughlin ........... B61C 17/02
                                                                 105/231
2006/0005739 A1 *  1/2006  Kumar .................... B60L 50/15
                                                                 105/35
2009/0293759 A1 *  12/2009  Schmitz .................... B61C 7/04
                                                                 105/51
2016/0264152 A1 *  9/2016  Semple .................... B60L 9/00

OTHER PUBLICATIONS

Canadian Office Action from Canadian Application No. 3,075,075 dated Apr. 30, 2021.

* cited by examiner

*Primary Examiner* — Robert J McCarry, Jr.
(74) *Attorney, Agent, or Firm* — Dilworth & Barrese, LLP

(57) ABSTRACT

A locomotive suited for use as a switcher for road and/or yard work is provided. The switcher comprises a mother unit having an engine for converting fuel into electricity. The mother unit includes two trucks supporting wheels on a plurality of axles, and a plurality of traction motors to provide tractive force to the mother unit's axles. The switcher also includes a slug unit operatively coupled to the mother unit in a manner to transmit electric power, signals and hauling force. The slug unit can include at least one truck, which can be removed from a retired locomotive and at least one traction motor electrically coupled to the mother unit and operatively coupled to the axle(s). Sufficient ballast can be added to equalize weight per axle. The switcher combines the power of a locomotive with more axles with the maneuverability of a locomotive with fewer axles.

16 Claims, 4 Drawing Sheets

INCREASED TRACTIVE EFFORT YARD AND ROAD SWITCH LOCOMOTIVES

BACKGROUND OF THE INVENTION

The invention relates generally to a railroad switch, or road switch locomotive, constructed and arranged to move railway trains, rolling stock and other objects around a train yard and to and/or from nearby industries.

A locomotive is commonly used to pull trains of railroad cars (railcars) on rails. Such railroad cars, when coupled together and hauled by one or more locomotives, form a train. Some locomotives are connected directly to electric power, such as third rail or to overhead catenary, which can provide power for traction. Other locomotives, sometimes referred to as diesel or diesel/electric locomotives, include a fuel powered generator that can produce electric power for traction, which is then transmitted to the locomotive's traction motors to drive the wheels.

A diesel/electric locomotive is shown generally as a locomotive 100 in FIG. 1. Locomotive 100 includes eight wheels 110, which ride on a pair of rails 105. A left-side and a right-side wheel 110 are supported by an axle 115 and together, comprise a wheel set. A pair of axles 115 are coupled to each of two 2-axle trucks 120. Each of the 2-axle trucks 120 support two axles 115, for a total of four axles 115 and therefore, four wheelsets. A main body 130 of locomotive 100 is supported by the two, 2-axle trucks 120.

The turning radius and maneuverability of locomotive 100 is impacted by the wheel base of each truck 120 and the spread and maneuverability of each truck 120 under main body 130. In general, the farther apart the front and rear wheels 110 of truck 120 and the farther apart the front wheels 110 of the front truck 120 and the rear wheels 110 of the rear truck 120, the lower the maneuverability of locomotive 100, i.e., the larger the radius of curvature required for locomotive 100 to safely navigate tracks 105.

Locomotive 100 includes an engine 135 within main body 130 for converting fuel into electricity. This electricity is transferred to electric traction motors (not shown, but well known in the art), located at each axle 115, for imparting rotational force to axles 115, to rotate wheels 110. As wheels 110 rotate, traction between wheels 110 and rail 105 causes locomotive 100 to move along rails 105. If too much power is supplied to wheels 110, they will slip (spin) with respect to rails 105 and not cause locomotive 100 to move any faster. Therefore, more wheels with corresponding weight per axle, generally results in more locomotive hauling power.

The weight on each axle 115 is proportional to wheel traction and therefore, how much rotational force can be supplied to each axle before wheel slippage begins to occur. Therefore, increasing the weight of locomotive 100 can increase the amount of power supplied to wheels 110, without causing wheels 110 to slip with respect to track 105. Therefore, more weight generally means more locomotive hauling power. It is also important to supply a substantially even weight to each axle 115, to maximize the ability of each wheel 110 to help drive locomotive 100, to help prevent slippage on the least weighted wheel.

It is often desirable to increase the speed and/or power of a locomotive. This has been accomplished by increasing the number of wheelsets receiving electromotive force and the weight and power of the locomotive. Generally, the more wheelsets, the more power can be supplied by a locomotive to move a train. A high power locomotive 200 is shown generally in FIG. 2. Locomotive 200 includes a pair of 3-axle trucks 220. A 3-axle truck supports six wheels 210 and locomotive 200 has a total of six wheelsets and 12 wheels 210. The use of additional wheelsets permits high power locomotive 200 to employ more total tractive force than locomotive 100. Accordingly, 6-axle locomotive 200 can typically be made to pull heavier loads and/or pull loads faster than 4-axle locomotive 100.

6-axle locomotive 200 has drawbacks. For example, the use of six axles and/or a larger engine to provide the additional power can cause high power locomotive 200 to be longer and less maneuverable than locomotive 100. A 6 axle unit can commonly be between about 10 feet to about 20 feet longer than a 4 axle unit. The overall length of 4 axle units can range from about 40 feet to about 60 feet and 6 axle units from about 65 feet to about 85 feet. A 2-axle truck generally has a wheelbase (axle spread) of about 10 feet. Two 2-axle truck locomotive 100 will have the same overall wheelbase of about 10 feet. By comparison, a 3-axle truck generally has about a 15-18-foot wheelbase. The overall wheelbase of two 3-axle truck locomotive 200 will typically be about the same 15 to 18 feet. Thus, the distance between the front and rear wheels 210 of locomotive 200 is about 20 to 30 feet longer than the distance between front and rear wheels 110 of locomotive 100. Therefore, locomotive 200 is less maneuverable than locomotive 100 and less suitable for use as a switcher. For example, space in a train yard tends to be limited and the curves tend to have a smaller radius of curvature. However, switchers often need to be very powerful, because they are often moving cars and other locomotives from a standstill.

Accordingly, there is a need for more powerful yard switchers that exhibit high maneuverability and tight turning radii. The present invention is directed to overcoming these and other deficiencies in the art.

SUMMARY OF THE INVENTION

Generally speaking, in accordance with the invention, a locomotive suited for use as a higher power switcher is provided. The switcher can comprise a mother unit (prime mover) having an engine for converting fuel into electricity with an electric generator. The mother unit includes two trucks, each commonly supporting two wheels on a plurality of axles; and a plurality of traction motors electrically coupled to the generator and operatively coupled to the mother unit's axles to provide effective tractive effort force to the mother unit's axles. The switcher also includes a slug unit operatively coupled to the mother unit in a manner to transmit pulling force and to turn along a curved rail independently from the mother unit. The slug unit can include one truck supporting two axles. At least one and preferably two traction motors should be electrically coupled to the mother unit and operatively coupled to the axle(s). The slug unit should include a platform. The platform can support, inter alia, sufficient ballast to provide a substantially uniform weight per axle among each of the slug unit axles and mother unit axles. The mother unit and/or slug unit can include controls to regulate tractive and braking power of the mother unit and slug unit as a unitary articulated switcher. The slug unit can be operatively coupled to the mother unit for control of both power for tractive effort and braking.

The invention also comprises a method of constructing a switcher. The method comprises removing a 2-axle truck from a retired locomotive; coupling the 2-axle truck to a functioning locomotive as a mother unit; operatively coupling the 2-axle truck to the functioning locomotive to transmit pulling force and electricity for power and control, such that the truck can be transformed into a slug unit to the functioning locomotive as a mother unit (prime mover). The 2-axle truck is provided with traction motors, preferably on both axles and receives electric power from the engine. The method should also include adding ballast to the slug unit, to substantially equalize the weight per axle of the slug unit and mother unit. This can be in the form of metal plates, concrete, sand and the like.

A core objective of the invention is to increase the switch/road switch locomotive's tractive effort (power) and maintain high maneuverability.

Still other objects of the invention will in part be obvious and will, in part be apparent from the specification and drawings. The invention accordingly comprises the article of manufacture, method of using the article, and the method of making the article, which will be more fully exemplified in the articles and methods hereinafter described, and the scope of the invention will be indicated in the claims.

BRIEF DESCRIPTION OF THE DRAWINGS

For a fuller understanding of the invention, reference is had to the following description, taken in connection with the accompanying drawings, in which.

As used herein, identical reference numerals will indicate similar structures. The drawings, which are not necessarily drawn to scale, are for purposes of illustration only and are not intended to be interpreted as limiting the scope of the invention.

DETAILED DESCRIPTION OF THE PREFERRED EMBODIMENTS

Figure 1:
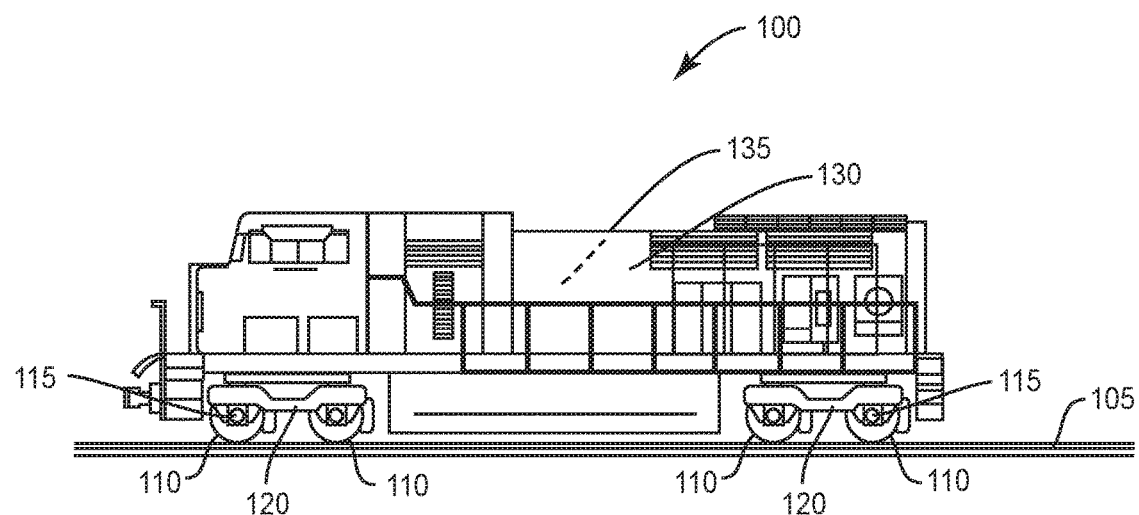
FIG. 1 is a side view of a locomotive having two 2-axle trucks.
Figure 2:
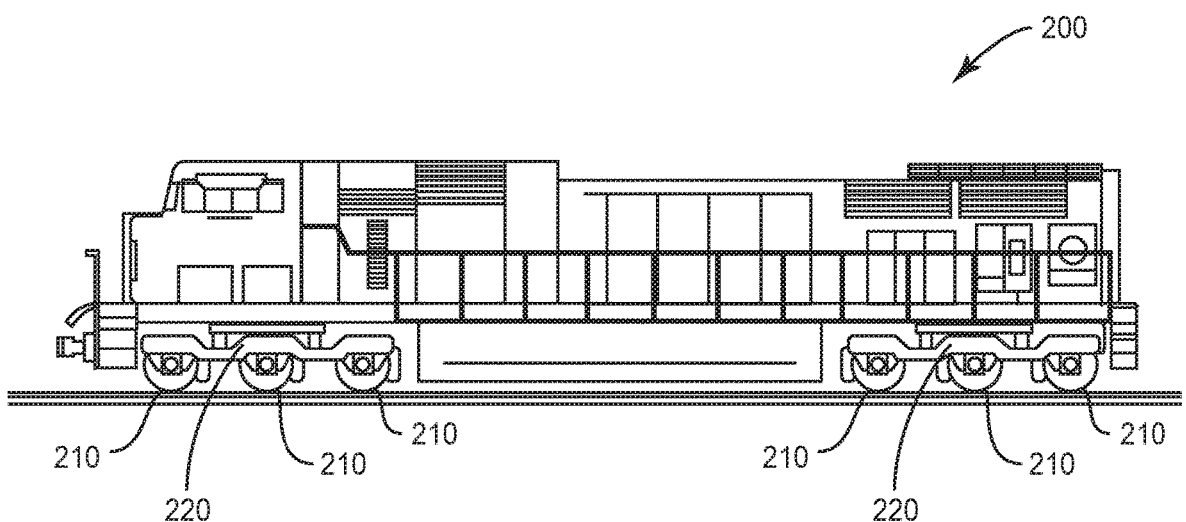
FIG. 2 is a side view of a high power locomotive having two 3-axle trucks.

A switching service locomotive or switcher is a railroad locomotive intended for moving cars and assembling trains of railroad cars to be ready for a road locomotive to take over and haul the train of cars for long distances at high speeds. Switchers and road switchers are the railroad rail analogs to tugboats. They can be used for disassembling a train that has been brought in, and generally moving railroad cars and other locomotives around a yard. Switchers may also make short transfer runs and may be the only motive power permitted on certain branch lines and at various customer facilities located along the line of road. Some switching and terminal railroad's entire locomotive roster can be comprised only of switcher/road switcher units. Therefore, switchers in accordance with the invention should have a high starting tractive effort for getting heavy cars rolling quickly. Switchers should be geared to produce high torque but can be restricted to low top speeds.

The invention relates to a locomotive apparatus that is well suited for use as a switcher in a train yard or for local service. Switchers in accordance with the invention combine the high tractive power of larger locomotives, with the small turning radii and maneuverability of smaller locomotives. In addition, switchers in accordance with the invention can be constructed in a cost effective, environmentally friendly manner by re-purposing trucks from inefficient locomotives (preferably no or low EPA TIER locomotives) that are taken out of service.

Switchers in accordance with the invention comprise a four-axle locomotive mother unit (prime mover), having an electricity generating engine supported by two 2-axle trucks. A slug unit is coupled to the mother unit. The slug unit comprises one 2 or 3-axle, preferably one 2-axle truck, supporting ballast for weight equalization, and assorted connections to transmit electrical power and signals with the mother unit and transmit that power to the traction motor(s) driving one or more of the axles of the slug unit. The slug unit can be coupled to the mother unit with a known coupling device(s), that permits articulation and hauling between the slug unit and the mother unit as the switcher navigates curved rails. Therefore, the switcher will have the turning radius of a 2-truck/2-axle locomotive, but greater tractive power.

Switchers in accordance with the invention can be made by refurbishing locomotives that are taken out of service. Locomotives commonly have BHP (Brake Horse Power, essentially, the power is supplied to the axles) generally in the range of 1,000 HP to 2,000 HP. The highest horse power in a standard production model 4 axle unit has been in the range of about 3,000 HP. The electrical generating capacity of such units can result in a short time rating status below approximately 9 mph, at least for DC traction units.

In many cases, the introduction of public sector assisted finance will require the retirement of an equivalent number of older, less efficient (less environmentally friendly) locomotives to match the number of newly purchased locomotives. It has been determined that although the engine of these retired locomotives might be environmentally undesirable, the trucks and traction motors remain suitable for reuse, without impinging emissions or funding standards or requirements. Therefore, the retirement of older locomotives can provide a cost-effective supply of trucks and traction motors for use in constructing switchers/road switch locomotives in accordance with the invention.

Figure 4:
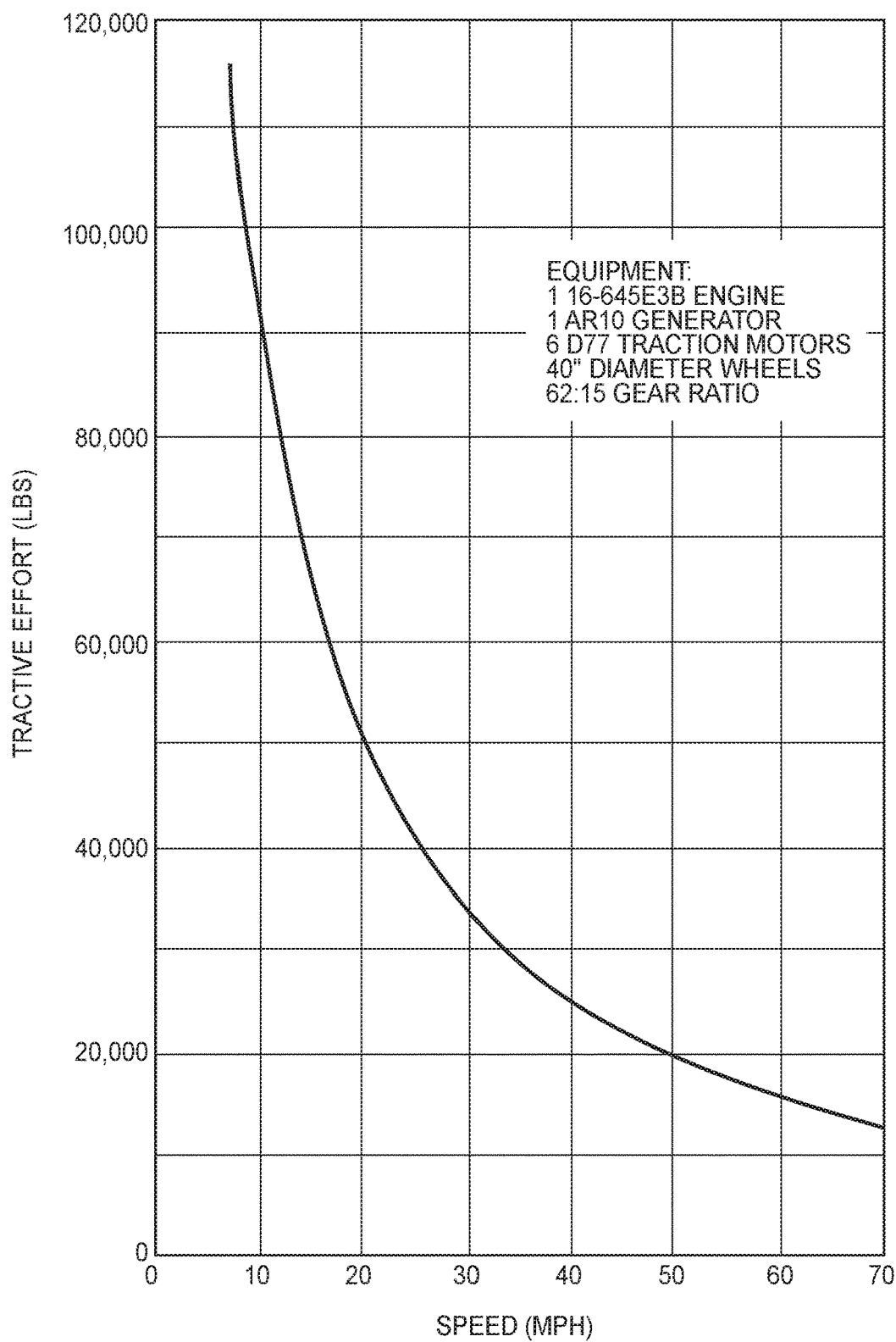
FIG. 4 is a power curve graph for a 6-axle locomotive.
Figure 5:
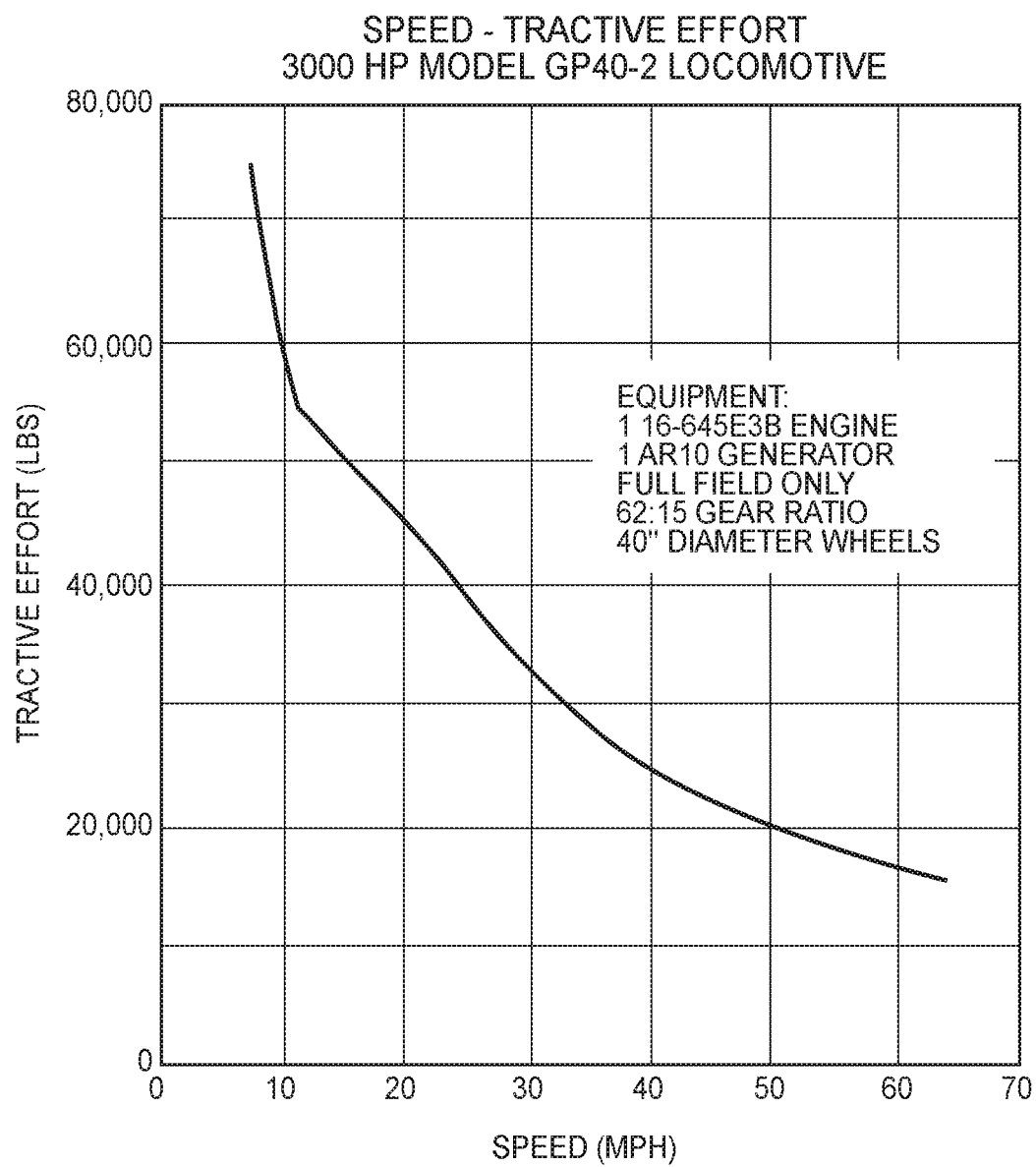
FIG. 5 is a power curve graph for a 4-axle locomotive with the same engine, generator and traction motors as the locomotive of FIG. 4.

Switch/road switch locomotives in accordance with the invention should produce high hauling power, but do not need to attain high speeds. FIG. 4 presents a power curve for a 3000 HP 6-axle SD40-2 locomotive. This locomotive has one 16-645E3B engine, one AR10 generator, six D77 traction motors, 40" diameter wheels and a 62:15 gear ratio. FIG. 5 presents a power curve for a 3000 HP GP40-2 4-axle locomotive. The 4-axle locomotive employs the same one engine, generator, gear ratio and wheel diameters as the 6-axle SD40-2 locomotive. It also has the same, but only four, D77 traction motors as compared to the 6-axle locomotive. Therefore, the 6-axle locomotive of FIG. 4 produces greater tractive force.

It can be seen that at 10 MPH, the 6-axle locomotive produces about 90,000 pounds tractive effort. This equals 15,000 pounds per axle. In contrast, the same engine only produces 60,000 pounds at 10 MPH. However, this equates to the same 15,000 pounds per axle at MPH.

Generally, the engine and generator of a DC locomotive can produce more electrical power (maximum throttle amperage) than can be used by the traction motors for a sustained period of time when operating below continuous minimum speed (CMS). For example, a standard 4 axle 2,000 HP unit may have a CMS of about 10.8 MPH, at the low end. A 4 axle 1,000 HP locomotive may have a CMS of about 6.7 MPH. A mid-range 1,500 HP locomotive can have a CMS of about 9.3 MPH. Therefore, it can be seen that the increasing HP creates the ability to produce more energy (amperage), while the type and number of traction motors remain fixed. Therefore, to optimize the very low speed end of the power curve, a unit with 2000 BPH could support an additional truck with two standard (D77 type) traction motors. The HP per axle would drop from about 500 (2000÷4=500), down to about 330 times 6 axles. This value is therefore in excess of the 1000 BHP units with about 250 HP per axle and less than a 1500 BHP unit, which would have about 375. At the low end of the power curve, tractive effort (TE) should be increased in proportion to increased weight, which should represent approximately a 33% increase.

When a 1500 HP unit is paired with a 2-axle slug, in accordance with the invention, the HP per axle would decrease from about 375 to about 250 per axle, the same as with a 1000 HP unit. A few switchers do have six axle trucks, with HP as high as 3000 HP. The addition of an additional 2 or even 3 axle truck could lower CMS, and simultaneously add tractive effort (TE). Therefore, across the entire range of lower HP switch/road switch locomotives, this invention could add significant TE capacity at a range of the power curve by effectively lowering the CMS (Continuous Minimum Speed, the slow speed at which a locomotive can operate continuously without overheating the traction motors).

Switch/road switch locomotives in accordance with the invention can be constructed by repurposing an existing 3 or preferably a 2-axle truck from an existing locomotive as the slug portion of a switcher in accordance with the invention. The base of the truck can be adapted to be operated in conjunction with a 4-axle 2000 or 3000 (or otherwise) HP "mother unit," for low-speed yard/local road service. Reconfiguring the truck can involve replacing traction motor leads. Power leads for traction motors and blowers can be installed on the mother unit. In addition, the airbrakes of the slug unit should be coupled directly to the mother unit's brake system. The slug would typically also require supplemental connections with the mother unit in addition to the standard coupler to aid and insure proper alignment These modifications and any needed refurbishing, cleaning, updating and maintenance are well within the ordinary skill of normal qualified rail road mechanics A platform is typically needed to be installed on top of the truck. The platform can include standard lights, stairs and plows, as necessary to perform normal service. The platform can also support sufficient ballast (metal plates, concrete and the like), so that all the axles support approximately the same weight for uniform traction. The truck of the slug unit should also include some type of snubbers or other forms of support and each of its four corners for alignment control.

Switch/road switch locomotives, in accordance with the invention should be able to provide the same tractive effort, but with one third fewer units. Each retired locomotive should be able to generate the core truck components for two slugs for two switchers in accordance with the invention.

Figure 3:
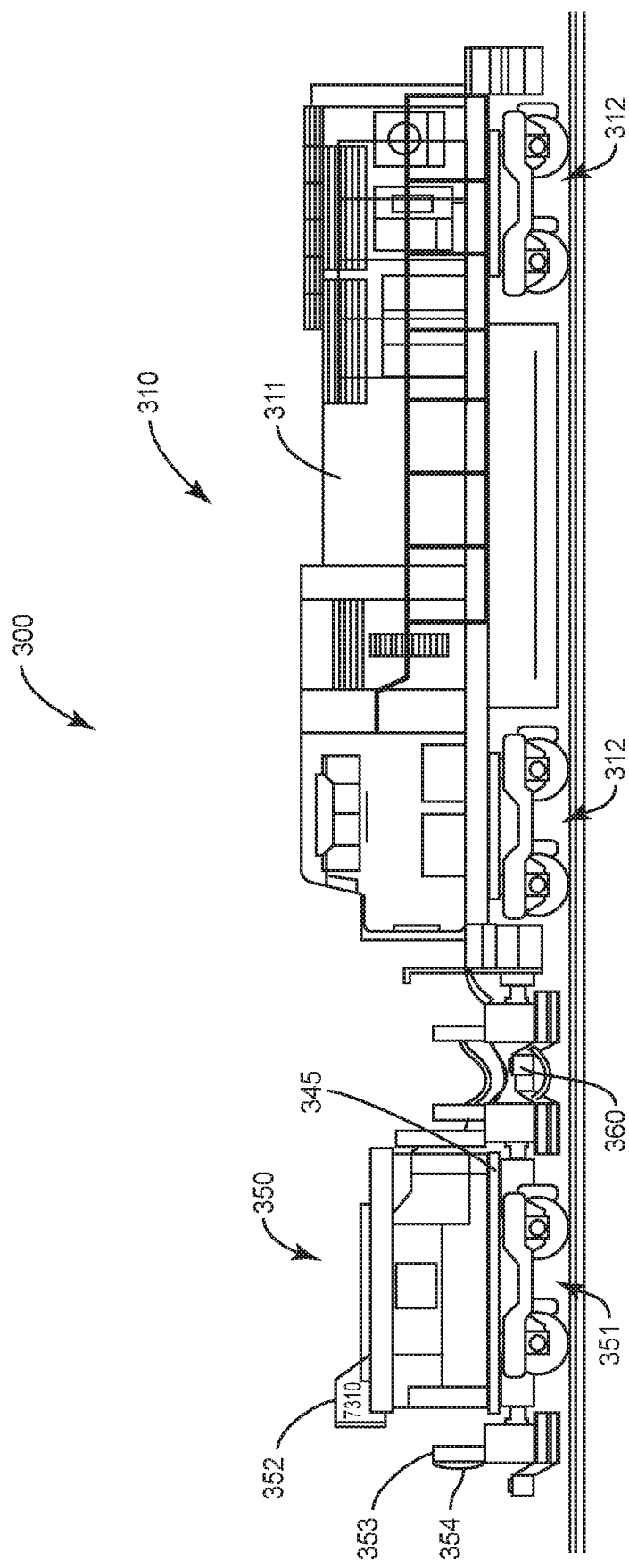
FIG. 3 is a side view of a switcher in accordance with a preferred embodiment of the invention.

A switch/road switch locomotive, 300 in accordance with a preferred embodiment of the invention is shown generally in FIG. 3. Switch/road switch locomotive 300 includes a mother unit 310 and a slug unit 350. Mother unit 310 can be joined to slug unit 350 with an articulating coupling 360 as well as various electrical and air brake system connections (not shown), to ensure that mother unit 310 and slug unit 350 operate as a single switcher locomotive.

Mother unit 310 includes a diesel engine (not shown) within a main housing 311. The diesel engine powers a generator (not shown) and converts the diesel fuel into electrical power. The electrical power is transmitted to traction motors (not shown) on the two 2-axle trucks 312 of mother unit 310. This electrical power is also transmitted to a 2-axle truck 351 of slug 350. Thus, the engine of mother unit 310 is used to supply electrical power to the traction motors for six separate axles.

Slug 350 also includes various components needed for proper operation. Slug 350 includes a headlight/number board 352; one or more handrails 353; and one or more ditch lights 354. Slug 350 also includes a platform 345. Platform 345 can be used to house a control cabinet and ballast weight to equalize the axle weight with that of mother 310.

It is important that platform 345 is stable. To help ensure stability, an existing center plate and body bolster support system of truck 351 can be augmented by at least four additional bolster connections. These can be located at or near the for outside corners of truck 351. If platform 345 is in fixed alignment with the remainder of truck 351, the distance between the center of truck 351 and coupler 360 should be minimized. Standard locomotive couplers can be used. The maximum curvature could, at many terminal and line of road industrial locations, easily exceed 15°. At some locations in a yard or older pinch points curvature can exceed 22 degrees. Switch/road switch locomotives in accordance with the invention can be made to be maneuverable enough to operate on tracks with curvatures of 15, 20, even 22 degrees or more.

The axle weight of slug portion 350 should be approximately equal to the per axle weight of mother unit 310. Generally, this can be in the neighborhood of about 30 tons per axle. The rough weight of a 2-axle truck is about 20 tons. Therefore, the total weight would be about 60 tons. Slug 350 preferably has a lower overall center of gravity compared to mother unit 310. This provides an advantage for stability.

The overall height of slug 350 should not exceed the height of a standard low-nose unit in order to maintain the engineer's current field of vision. In addition, truck-mounted lubricators can be installed to aid in negotiating tight curves found in many yards and terminals. It is also within the scope of the invention for two switcher units 300 to be operated as part of a multiple unit (MU) consist. The MU'ed locomotives should function as one locomotive in terms of breaking, acceleration and energy output functionality. The resulting gain in tractive effort should be equivalent to the addition of an entire 4 axle unit if 2 slug tenders are paired together.

Switch/road switch locomotives in accordance with the invention can typically provide enhanced hauling power up to about 30 MPH. An example of this is the relationship between the GP 40 and SD 40 locomotive models (see FIGS. 4 and 5). Both models have the same horsepower and prime mover, the main generator and the same type of traction motors. However, the GP 40 has four axles and the SD 40 has six axles. Therefore, a locomotive, in accordance with the invention, should be able to achieve the power of a 6-axle locomotive, with the maneuverability of a 4-axle locomotive.

It will thus be seen that the objects set forth above, among those made apparent from the preceding description, are efficiently attained, and, since certain changes may be made in carrying out the above method and in the article of manufacture set forth, without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A switcher locomotive suited for use as a switch or road switch unit, comprising:
   a mother unit comprising an engine and generator system adapted to convert fuel into electricity, no more than two mother unit trucks, each mother unit truck supporting wheels on no more than two respective mother unit axles, a plurality of mother unit traction motors electrically coupled to the generator system and operatively coupled to the mother unit axles to provide tractive effort to the mother unit axles;
   a slug unit mechanically coupled to the mother unit in a manner to turn along a curved rail independently with respect to the mother unit, the slug unit including no more than one slug unit truck, the slug unit truck supporting at least two slug unit axles, a plurality of slug unit traction motors electrically coupled to the generator system and operatively coupled to the slug unit axles to provide tractive effort to the slug unit axles; and
   controls to regulate tractive and braking power of the mother unit and slug unit.

2. The locomotive suited for use as a switch or road switch unit, of claim 1, wherein the mother unit has exactly four mother unit axles and exactly one independent traction motor coupled to each of the four mother unit axles and the slug unit includes exactly one slug unit truck supporting exactly two slug unit axles and one independent traction motor coupled to each slug unit axle.

3. The locomotive suited for use as a switch or road switch unit of claim 1, wherein the mother unit includes exactly two mother unit trucks, each having exactly two axles and the slug unit includes exactly one 2-axle slug unit truck.

4. The locomotive suited for use as a switch or road switch unit of claim 1, wherein the engine produces at least 1000 BHP.

5. The locomotive suited for use as a switch or road switch unit of claim 1, wherein the engine produces at least 2000 BHP.

6. The locomotive suited for use as a switch or road switch unit of claim 1, wherein the switcher comprises no more than 6 axles and the traction motors of each axle produce at least 200 HP.

7. The locomotive suited for use as a switch or road switch unit of claim 1, wherein the mother unit and slug unit are sized, constructed and adapted to be maneuverable enough to negotiate a track of at least 15° of curvature.

8. The locomotive suited for use as a switch or road switch unit of claim 1, wherein the mother unit and slug unit are sized, constructed and adapted to be maneuverable enough to negotiate a track with at least a 22° curvature.

9. The locomotive suited for use as a switch or road switch unit of claim 1, wherein the mother unit and slug unit have a substantially uniform weight per axle among the slug unit axles and the mother unit axles.

10. A method of constructing a switch or road switch locomotive unit comprising:
    removing a 2-axle truck from a retired locomotive, the 2-axle truck having exactly two axles;
    mechanically and electrically coupling the 2-axle truck to a functioning locomotive mother unit, to function as a slug unit to the mother unit, the 2-axle truck having a traction motor operatively coupled to each of the two axles;
    electrically coupling the traction motors to the mother unit to receive electric power from the mother unit;
    substantially equalizing the weight per axle of the slug and mother unit; and
    adding controls to govern power and braking functions of the slug unit.

11. The method of claim 10, wherein the mother unit comprises exactly two 2-axle trucks.

12. The method of claim 11, wherein each traction motors supplies at least 200 HP to the axles to which it is coupled.

13. The method of claim 11, wherein each traction motors supplies at least 300 HP to the axles to which it is coupled.

14. The method of claim 11, wherein the slug unit is articulated with respect to the mother unit, and negotiates a train track having at least a 15° curvature.

15. The method of claim 11, wherein the slug unit is articulated with respect to the mother unit, and negotiates a train track having at least a 20° curvature.

16. A switcher locomotive suited for use as a switch or road switch unit, comprising:
    a mother unit comprising
       an engine and generator system adapted to convert fuel into electricity, a mother unit truck system consisting of two mother unit trucks, each mother unit truck consisting of wheels mounted on no more than two mother unit axles, a plurality of mother unit traction motors electrically coupled to the generator system and operatively coupled to the mother unit axles, the mother unit traction motors adapted to provide tractive effort to the mother unit axles;
    a slug unit mechanically coupled to the mother unit in a manner to turn along a curved rail independently with respect to the mother unit, the slug unit comprising
       a slug unit truck system consisting of one slug unit truck, the one slug unit truck supporting at least two slug unit axles,
       a plurality of slug unit traction motors electrically coupled to the generator system and operatively coupled to the slug unit axles, adapted to provide tractive effort to the slug unit axles; and
    controls to regulate tractive and braking power of the mother unit and slug unit.

* * * * *